(12) United States Patent
Varasundharosoth et al.

(10) Patent No.: US 6,990,965 B2
(45) Date of Patent: Jan. 31, 2006

(54) COMBUSTION-ENGINE AIR-INTAKE OZONE AND AIR ION GENERATOR

(76) Inventors: Birasak Varasundharosoth, 20 Yen Akas Road, Bangkok (TH); Somroj Phanichamnuay, 20 Yen Akas Road, Bangkok (TH)

( * ) Notice: Subject to any disclaimer, the term of this patent is extended or adjusted under 35 U.S.C. 154(b) by 58 days.

(21) Appl. No.: 10/892,695

(22) Filed: Jul. 15, 2004

(65) Prior Publication Data

US 2005/0126550 A1    Jun. 16, 2005

(30) Foreign Application Priority Data

Dec. 16, 2003  (TH) ..................... 087433

(51) Int. Cl.
*H01J 27/02*    (2006.01)
(52) U.S. Cl. ................... 123/539; 204/176
(58) Field of Classification Search ............... 422/186.04–186.08; 204/176; 123/536–539
See application file for complete search history.

(56) References Cited

U.S. PATENT DOCUMENTS

| | | | |
|---|---|---|---|
| 1,725,661 A | 8/1929 | McPartland | |
| 1,873,746 A | 8/1932 | English | |
| 4,434,771 A | 3/1984 | Slomnicki | |
| 4,587,807 A * | 5/1986 | Suzuki | 60/274 |
| 4,695,358 A * | 9/1987 | Mizuno et al. | 204/174 |
| 5,010,869 A | 4/1991 | Lee | |
| 5,061,462 A * | 10/1991 | Suzuki | 422/186.04 |
| 5,236,672 A * | 8/1993 | Nunez et al. | 422/186.04 |
| 5,487,874 A * | 1/1996 | Gibboney, Jr. | 422/186.03 |
| 5,519,357 A | 5/1996 | McAllister | |
| 5,596,974 A | 1/1997 | Hall | |
| 5,711,283 A * | 1/1998 | Trigger | 123/637 |
| 5,942,026 A | 8/1999 | Erlichman | |
| 6,245,299 B1 * | 6/2001 | Shiloh et al. | 422/121 |
| 6,305,363 B1 | 10/2001 | Klomp | |
| 6,463,917 B1 | 10/2002 | Silver | |
| 6,769,420 B1 * | 8/2004 | Motouchi | 123/539 |
| 2002/0170817 A1 * | 11/2002 | Goudy, Jr. | 204/164 |
| 2002/0195089 A1 | 12/2002 | Zetmeir | |
| 2004/0065306 A1 | 4/2004 | Parsa | |
| 2004/0071614 A1 | 4/2004 | Kravitz | |

* cited by examiner

*Primary Examiner*—Marguerite McMahon
(74) *Attorney, Agent, or Firm*—Richard B. Main

(57) ABSTRACT

An engine power booster comprises an electronic voltage generator that converts the direct current (DC) battery voltage of a vehicle at a power input, into an AC ripple voltage of 2.8–5.0 KV peak-to-peak at 2.4–14.0 KHz, that includes a DC voltage of 2.0–3.5. KV which are provided at an electrode output. A wire electrode is connected to the electrode output, and comprises a simple insulated stranded wire stripped bare at a distal end. A corona discharge generates ozone at the distal end during operation inside an internal combustion engine's air intake duct. Such ozone intake increases engine power and fuel efficiency.

7 Claims, 2 Drawing Sheets

COMBUSTION-ENGINE AIR-INTAKE OZONE AND AIR ION GENERATOR

BACKGROUND OF THE INVENTION

1. Field of the Invention

The present invention relates to combustion engines, and more particularly to improvements in performance that result from corona discharge treatment of their air intakes.

2. Description of Related Art

Internal combustion engines depend on the oxidizing of hydrocarbons. Ozone is one of the most powerful oxidants. Ozone is produced naturally by ultra-violet (UV) rays of the sun and lightning. Ozone can also be generated artificially by UV-lamps, cold-corona discharge, and Teslaire cold-plasma. The first simulates the action of the sun, and the latter two simulate lightning. UV-light in the 180–90 nanometer frequency will generate ozone from ambient air without producing nitrous oxide compounds. But, UV techniques cannot generate high volumes of ozone even with oxygen feed, e.g., not more than 1–3 micrograms of ozone per milliliter of oxygen. However, humidity in the intake air reduces the effectivity of corona discharge ozone generators, while UV-type ozone generators are little affected by water vapor.

W. S. English wrote in U.S. Pat. No. 1,873,746, issued Aug. 23, 1932, that engine combustion can be enhanced by electric-arc discharge activation of the air before it enters a carburetor. The benefits claimed include increased power and reduced carbon deposits. The electrodes illustrated are operated such that "large amount of ozone" is produced.

Israel Slomnicki describes, in U.S. Pat. No. 4,434,771, issued Mar. 6, 1984, an ozone production system that regulates how much ozone is introduced at the air intake of a combustion engine so as to limit the amount of excess ozone being exhausted.

Ultraviolet light in the 180–190 nanometer wavelength generates ozone from ambient without producing nitrous oxide compounds. But, UV cannot generate the concentrations necessary for health or industrial applications, even with oxygen feed. Typically, UV systems produce only 1–3 $\mu$g/ml, sufficient only for air purification and cleaning of water in small quantities.

Corona discharge generates high concentrations of ozone, up to 140 $\mu$g/ml, required for industrial applications. If it is properly engineered and used in conjunction with an air dryer, it may be used with ambient air. It is the most cost effective way to produce large quantities of ozone, but reliability is always a problem. An improved variation is called dual-dielectric, used for medical purposes, but long term reliability is again problematic.

When nitrous oxide ($N_2O$) is heated to about 570° F. (~300° C.), it splits into oxygen and nitrogen. Injecting nitrous oxide into an engine makes more oxygen available for combustion. With more oxygen, more fuel can be injected, allowing the same engine to produce more power. Nitrous oxide is one of the simplest ways to provide a significant horsepower boost to any gasoline engine.

What is needed is a simple, inexpensive unit that can be easily installed by the typical user and that requires only insignificant modification of the engine.

SUMMARY OF THE INVENTION

Briefly, a power booster embodiment of the present invention comprises an electronic voltage generator that converts the direct current (DC) battery voltage of a vehicle at a power input, into an high voltage DC of 2.0–3.5 kilovolts (KV) with an alternating current (AC) ripple voltage of 2.8–5.0 KV peak-to-peak, at a frequency in the range of 2.4–14.0 KHz, which is produced at an electrode output. A wire electrode is connected to the electrode output, and comprises a simple insulated stranded wire stripped bare at a distal end. A corona discharge is generated at the distal end during operation, and that produces ozone which is inducted into an internal combustion engine. Such ozone intake increases engine power and fuel efficiency.

An advantage of the present invention is a device is provided to increase passenger car fuel efficiency.

Another advantage of the present invention is that a power boosting device is provided that is simple, inexpensive, and effective.

A still further advantage of the present invention is that a power boosting device is provided that is quick and simple for a typical user to install.

Another advantage of the present invention is an engine power booster is provided that requires no modifications to the engine on which it is installed.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
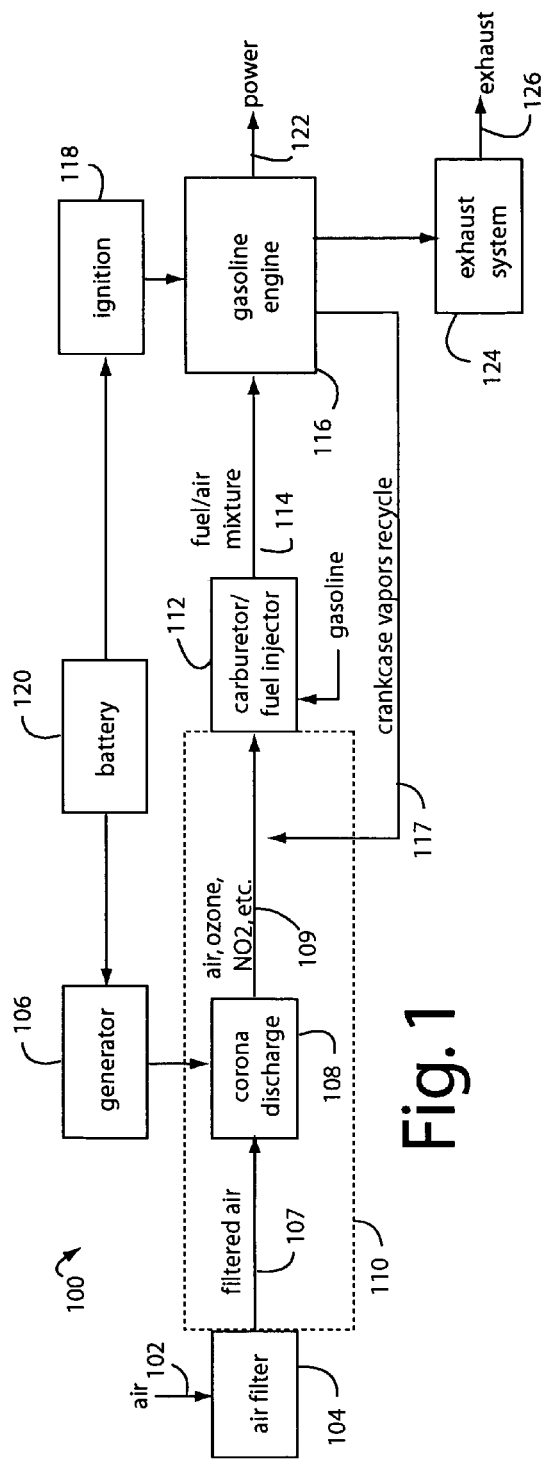
FIG. 1 is a functional block diagram of a gasoline engine system embodiment of the present invention.

FIG. 1 illustrates a gasoline engine system embodiment of the present invention, and is referred to herein by the general reference numeral 100. The system 100 comprises a fresh air intake 102, an air filter 104, and a high-voltage generator 106 connected to a corona discharge electrode 108 positioned inside an air intake duct 110. In a typical automobile, the air filter 104 is remote from a carburetor/fuel-injector 112 and the duct 110 is a long plastic or fiberglass tube about twenty inches long and a couple of inches in diameter. The carburetor 112 provides a fuel/air mixture 114 to an internal combustion engine 116. As is typical in applications with smog control, blow-by and other crankcase vapors 117 are returned to the duct 110 to be reburned. It is important that the corona discharge electrode 108 be upstream of the point where these vapors 117 are injected into the duct 110. Such vapors would otherwise foul the electrode.

The system 100 further comprises an electronic ignition 118 that is powered by a car battery 120. Such also provides power, e.g., via an ignition switch, to the high-voltage generator 106. The engine 116 produces mechanical power 122 that is used to move the car. An exhaust system 124 typically includes a catalytic converter for smog control and outputs an exhaust 126.

All these elements, except high-voltage generator 106 and corona discharge electrode 108, are common components and assemblies found in conventional automobiles. Embodiments of the present invention provide a simple and affordable device that installs easily to provide the functions of high-voltage generator 106 and corona discharge electrode 108.

The high-voltage generator 106 produces an high voltage DC of 2.0–3.5 kilovolts (KV) with an alternating current (AC) ripple voltage of 2.8–5.0 KV peak-to-peak, at a frequency in the range of 2.4–14.0 KHz, to the corona discharge electrode 108. Such AC operating frequencies provide good ozone producing results at the corona discharge electrode 108.

The corona discharge electrode 108 is simple to construct and to install. In one commercial embodiment, such comprises an insulated stranded wire where the insulation has been stripped back 2–4 mm from the end. This is inserted through a small hole drilled by the user into the duct 110. The wire and hole are sealed with epoxy glue to hold the electrode near the center of airflow and to prevent vacuum leakage. The end of the wire is expected to corrode away during use, and tests indicate an additional 1–2 mm of insulation should be stripped away every 20,000 km driven. The position of the corona discharge electrode 108 in the duct 110 will affect how rapidly the electrode corrodes. The best position is where the air is the cleanest, e.g., after the filter 104 and before the point the crankcase vapors 117 are recycled.

The stranded wire in the corona discharge electrode 108 is copper with silver plating. Finely stranded wire may be preferable. Such insulated silver-plated copper stranded wire is affordable and produces good results. More expensive materials could be used, but an object of the present invention is to keep manufacturing costs low and the user installation simple. Therefore, the corona discharge electrode 108 can comprise nothing more than a wire lead from the generator 106 that has been stripped back by the user and inserted into the duct 110.

The exposed parts of the wire generate an electric corona discharge that will produce ozone from air. The AC frequencies selected help produce a charge concentration at the surface of the wires known as the "skin effect". Such AC frequencies also lower the voltages required to produce satisfactory levels of ozone during operation.

In prototype tests in a Saab 9000, a Toyota Corona, and an Isuzu one-ton pickup, their respective fuel efficiencies improved 7.89–10.06% when the units where properly installed and operating.

Figure 2:
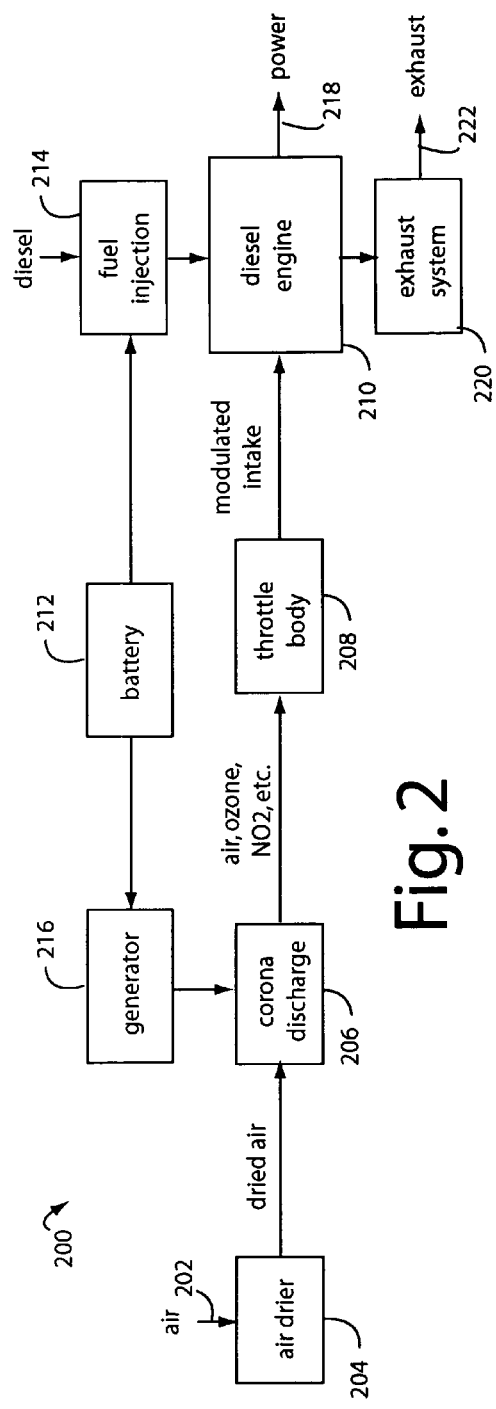
FIG. 2 is a functional block diagram of a diesel engine system embodiment of the present invention.

FIG. 2 illustrates a diesel engine embodiment of the present invention, and is otherwise similar to that shown in FIG. 1. A diesel power booster system 200 comprises a fresh air intake 202 that passes through an air drier 204 or ordinary cartridge element-type air filter. The conditioned air is subjected to a corona discharge electrode 206 and such generates ozone and nitrous oxide from atmospheric air. A throttle body 208 regulates the intake to a diesel engine 210. A battery 212 supplies operating power to a diesel-fuel injection system 214 and an electronic voltage generator 216. The diesel engine 210 outputs mechanical power to drive the car, truck, or bus the system is mounted. An exhaust system 220 emits an exhaust 222 that has reduced pollutants due to the ozone being generated by the corona discharge electrode 206.

Figure 3:
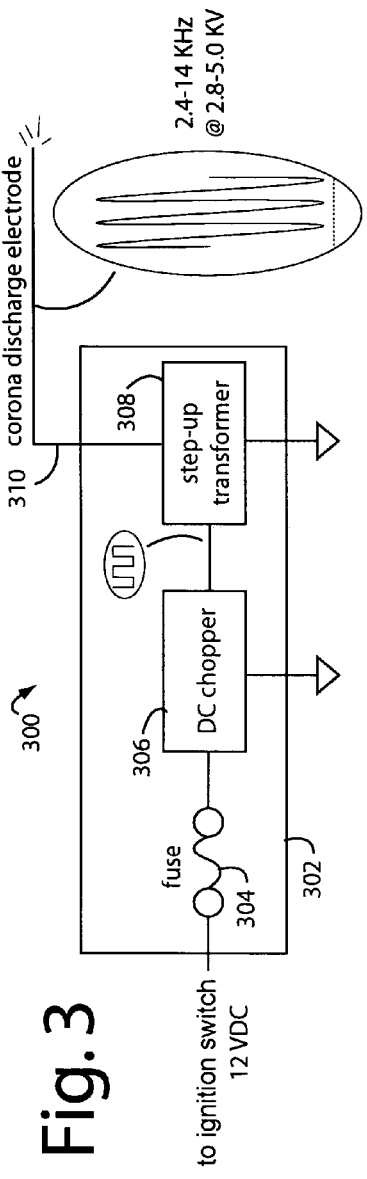
FIG. 3 is a schematic diagram of a power booster embodiment of the present invention.

FIG. 3 represents an engine power booster embodiment of the present invention, and is referred to herein by the general reference numeral 300. The power booster 300 comprises a potted assembly 302 that encapsulates a fuse 304, a direct current (DC) chopper 306, and a step-up transformer 308. A corona discharge electrode 310 is preferably a simple, inexpensive insulated stranded wire, and is typically color coded green. The power input wire from the car ignition switch to fuse 304 is typically color coded red. Such color-codings are intended to make the user installation easier. The step-up transformer 308 can be a magnetic ferrite-core type.

The potted assembly 302 is constructed with power transistors and printed circuit boards heat-sunk to an aluminum plate. It draws no more than 800 mA at 12-VDC, and outputs 2.4–14.0 KHz at a DC voltage of 2.0–3.5 KV with an AC ripple voltage of 2.8–5.0 KV peak-to-peak. It is housed in a small plastic box-enclosure that is potted with epoxy resin or RTV-silicone. Such makes the whole very rugged and relatively immune to mechanical vibration and shock.

Figure 4:
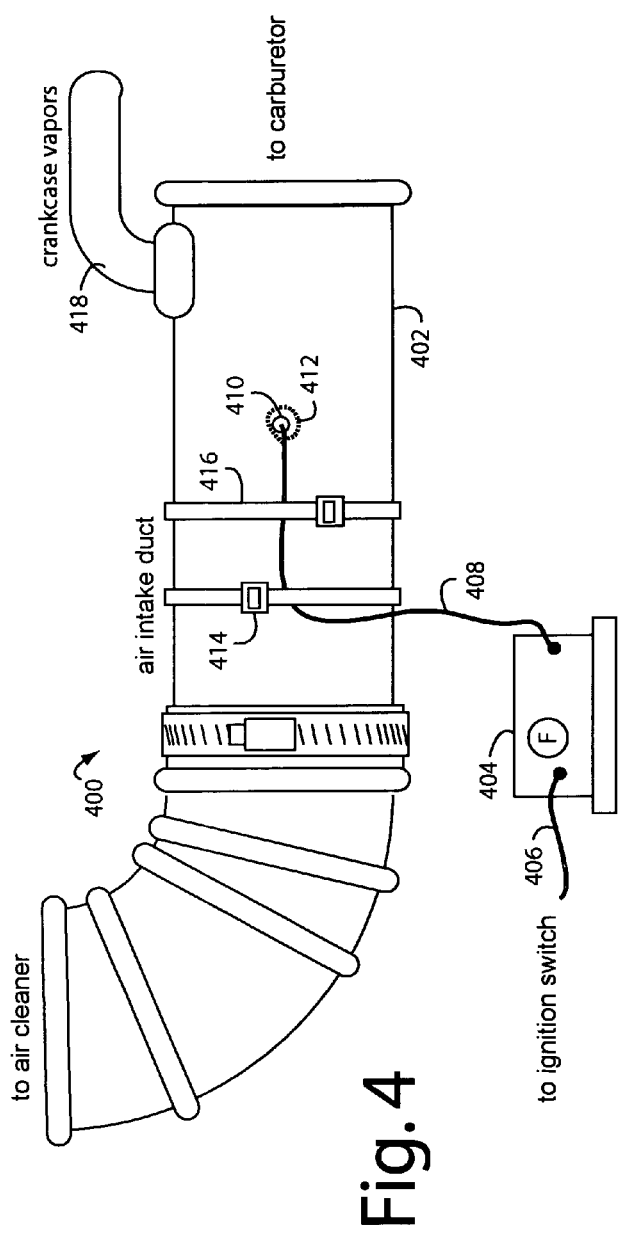
FIG. 4 is a perspective diagram of a power booster installation embodiment of the present invention.

FIG. 4 represents the typical installation of an engine power booster embodiment of the present invention, and is referred to herein by the general reference numeral 400. Such installation 400 comprises an air intake duct 402, in a passenger car, that leads from a remote air cleaner to the carburetor or fuel injection throttle bodies. A power booster generator 404 is mounted nearby, e.g., on an inner fender wheel well. A red-colored power input wire 406 is connected to the ignition switch so that it receives operating power whenever the engine is running. A green-colored output wire-electrode 408 is inserted into the air intake duct 402 through a small hole 410 drilled by the user. A glob of epoxy glue 412 is used to seal the hole. A pair of nylon cable ties 414 and 416 are installed by the user and are used as strain relief to keep the output wire-electrode 408 from being accidentally pulled out. The placement of hole 410 is upstream of any crankcase vapors recycle 418.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. An engine power booster, comprising:
    an electronic voltage generator for converting the direct current (DC) battery voltage of a vehicle at a power input, into an AC ripple voltage of 2.8–5.0 KV peak-to-peak at 2.4–14.0 KHz, that includes a DC voltage of 2.0–3.5 KV which are provided at an electrode output;
    a wire electrode connected to said electrode output, and comprising an insulated stranded wire stripped bare at a distal end;
    wherein, a corona discharge generated at said distal end during operation produces ozone that is inducted into an internal combustion engine and therein increases its power output and fuel efficiency.

2. The engine power booster of claim 1, further comprising:
    a potted assembly in which the electronic voltage generator is encapsulated and for increasing resistance to mechanical shock and vibration.

3. The engine power booster of claim 1, wherein:
    the wire electrode comprises silver-plated copper wire and about 1–2 mm of insulation at said distal end is stripped back.

4. The engine power booster of claim 1, further comprising:
    an air duct leading between an air filter and an internal combustion engine;
    a hole in the air duct through which said distal end of the wire electrode is inserted; and a sealant plugging the hole to prevent vacuum leakage.

5. The engine power booster of claim 4, wherein:
the hole and said distal end of the electrode are located upstream of any crankcase vapors recycling injection to reduce any fouling and corrosion that would otherwise occur more rapidly.

6. The engine power booster of claim 4, wherein:
the wire electrode is secured by strain relief to the air duct; and
the electronic voltage generator has its power input connected to an ignition system of said engine so that it operates when the engine is running.

7. The engine power booster of claim 2, further comprising:
an aluminum plate to which electronic components are heat-sunk inside the potted assembly and encapsulated.

* * * * *